United States Patent
Deflandre

[11] Patent Number: 6,049,508
[45] Date of Patent: Apr. 11, 2000

[54] METHOD FOR SEISMIC MONITORING OF AN UNDERGROUND ZONE UNDER DEVELOPMENT ALLOWING BETTER IDENTIFICATION OF SIGNIFICANT EVENTS

[75] Inventor: Jean-Pierre Deflandre, Ermont, France

[73] Assignees: Institut Francais du Petrole, Rueil-Malmaison; Gaz de France Service National, Paris, both of France

[21] Appl. No.: 09/206,298

[22] Filed: Dec. 7, 1998

[30] Foreign Application Priority Data

Dec. 8, 1997 [FR] France ................................. 97 15597

[51] Int. Cl.[7] .................................................. G01V 1/40
[52] U.S. Cl. ................................ 367/48; 367/37; 367/57; 181/112
[58] Field of Search ................................. 367/38, 37, 14, 367/57, 48; 181/122, 112

[56] References Cited

U.S. PATENT DOCUMENTS

| | | | |
|---|---|---|---|
| 4,432,078 | 2/1984 | Silverman | 367/37 |
| 5,010,527 | 4/1991 | Mahrer | 367/86 |
| 5,373,486 | 12/1994 | Dowla et al. | 367/135 |
| 5,461,594 | 10/1995 | Mougnot et al. | 367/48 |

FOREIGN PATENT DOCUMENTS

| | | |
|---|---|---|
| 2703470 | 10/1994 | France . |
| 59-132383 | 7/1984 | Japan . |
| 2292802 | 3/1996 | United Kingdom . |

*Primary Examiner*—Christine Oda
*Assistant Examiner*—Anthony Jolly
*Attorney, Agent, or Firm*—Antonelli, Terry, Stout & Kraus, LLP

[57] ABSTRACT

The invention is a method for facilitating discrimination and identification of seismic or microseismic events by means of permanent pickups in an underground zone under development. The method comprises permanent installation of, in one or more wells, elastic wave receivers, geophones and hydrophones leaving the wells clear for development of the zone, at least one reference pickup with direct acoustic coupling with the technical zone development equipment (pickup pressed against a production string for example) for detection of events directly connected with the operation of the wells (valve opening and closure, etc.), acquisition of the signals coming from the various receivers and from each reference pickup in response to the waves received, and comparative analysis of the signals associated with the receivers and with the reference pickup(s), in order to classify the records into different families according to whether the events in the underground zone are independent of the events detected by each reference pickup or depend directly or indirectly thereon, and for each family, application of specific processings. The method can be used for long-term monitoring of fluid production of storage reservoirs, such as hydrocarbons, various waste products, geothermics, etc.

21 Claims, 5 Drawing Sheets

METHOD FOR SEISMIC MONITORING OF AN UNDERGROUND ZONE UNDER DEVELOPMENT ALLOWING BETTER IDENTIFICATION OF SIGNIFICANT EVENTS

BACKGROUND OF THE INVENTION

1. Field of the Invention

The present invention relates to a method for facilitating discrimination and identification of seismic or microseismic events resulting from seismic monitoring of an underground zone under development.

The method according to the invention is applicable in reservoir zones or in underground cavities under development generally used for either extracting fluids or for injecting fluids therein.

2. Description of the Prior Art

Locating points in an underground zone, either a reservoir zone or a cavity, where microseismic events, linked with an activity resulting in a change in the stress field, is of great interest for good development of the zone, either the production of fluids extracted from a reservoir through one or more wells, or an injection of fluids into the zone.

The evolution of a hydrocarbon reservoir under production or of geothermal deposits can for example be monitored. In case of enhanced recovery notably, the oil is to be flushed out of the rock by injecting fluids at pressures and temperatures that can be very different from those of the environment. The resulting stress variations can lead to a fracturation of the environment which modifies fluid circulations in the reservoir and whose location is important.

It is also well-known to use underground reservoirs for fluid storage. These may be, for example, storage reservoirs for fluids in the liquid or gas phase where a certain microseismic activity induced by significant flow variations of the gas withdrawn from or injected into these reservoirs can be observed.

The reservoirs may also be reservoir zones or cavities used for waste storage, which have to be monitored in order to respect the environment and to comply with increasingly stringent regulations concerning pollution. An underground reservoir can be used for injecting drilling fluids containing solid particles which regulations forbid dumping thereto after use on drilling sites.

The temperature of the fluids injected is generally very different from the temperature of the environment at the depth where they are injected which, in case of massive injection, results in thermal stresses generating fractures and consequently a certain seismic activity. The injection pressure of these muds can also come into play and create stresses, thus leading great changes in the environment.

The seismic activity induced by the effects of the pressure or of the temperature can for example reveal the formation of fractures or stresses on previously existing fractures. They contribute to modifying the flow paths of the fluids in the environment, or they create paths allowing escape of the fluids out of the reservoir, containment breaks with possible pollution of the neighbouring zones, notably of an aquifer developed for potable water supply, which it is essential to detect.

Monitoring of reservoirs used for nuclear waste storage in order to prevent the injection operations leading to local temperature rises due to storage from causing breaks in the containment layers is also of great importance.

Although the mechanical origins of a microseismic activity are quite clear, analysis of the observed phenomena remains delicate in most cases because of the lack of any means allocated for acquisition of the results, the various scales on which the phenomena are observed, limited knowledge of the site investigated, etc. The time factor is also very important. Some events shortly follow the trigger phenomenon. It is for example the case for hydraulic fracturing where location of the events allows mapping all or part of the created fracture. Others produce deferred effects, notably in the case of massive production or of massive fluid transfer from a zone of the reservoir to another, with a range of influence that is often greater than the dimensions of the reservoir.

With microseismic monitoring, also referred to as passive seismic, the operator's aim is eventually to interpret very rapidly the data in connection with conventional production data (pressure, flow rate, temperature, etc.) so as to be able to take account of the mechanical response of the site in the development protocol in order to preserve the productivity of the well(s) or of the site. The observed microseismic activity observed can be associated with a mechanical degradation of the environment that can generate the occurrence of solids, with the opening of fractures that can communicate the reservoir with an aquifer, or with other phenomena of thermo-poro-mechanical origin whose consequences can induce a degradation of the well performances or even to damages.

Detection and location of seismic or microseismic events in a reservoir can be achieved, as it is well-known, by lowering into a well, at the end of a cable, a sonde containing a triaxial seismic receiver that is pressed against the wall of a well. Comparison of the signals picked up by the various pickups of the seismic receiver in the sonde (analysis of the polarization of the waves received) allows determination of the direction in which the seismic event has occurred, provided that the propagation environment is relatively homogeneous, and even to locate it when the signals received contain a succession of P type and S type waves.

For implementation of such a method, the well has to be cleared long enough for the sonde to be lowered to the desired depth, which is not compatible with long-term monitoring.

French Patents 2,593,292; 2,681,373; 2,685,139; and 2,703,470 notably describe various techniques for monitoring the evolution in time of underground reservoirs, comprising using seismic or other pickups permanently installed in one or more wells, without disturbing the various operations (production, injection, various operations carried out by means of these wells). Permanent installation of these pickups in wells allows seismic monitoring of a reservoir in order to detect various phenomena connected with the development thereof.

Permanent seismic pickups are for example installed outside a casing that is lowered into the well. They are embedded in the cement that is normally injected into the annular space between the casing and the well, which provides proper coupling with the surrounding formations.

The seismic pickups can also be fastened outside a production string installed in a well during completion operations. They are associated with mobile device suited to press them against the casing of the well, and with decoupling device for filtering the vibrations propagating along the production string.

Recording of the microseismic activity, also referred to as passive seismic or microseismic monitoring, is enhanced by using permanent well pickups when phenomena are located at great depths (from several hundred meters onwards).

French Patents 2,703,457; 2,703,470; and 2,728,973 describe long-term repetitive monitoring methods in reservoirs by application of elastic waves to a formation and acquisition of response signals reflected by the formation, by the permanent installation of emission and reception in wells or in the neighbourhood of the ground surface. Differential processings are applied to acquisitions achieved under identical conditions.

French Patents 2,688,896; and 2,689,647 notably also describe electronic acquisition and transmission systems specially designed to collect the signals from permanent pickups installed in wells outside casings or production strings, and to transmit them to a surface recording and control equipment during long-lasting repetitive monitoring or seismic surveys.

In the case of a well dedicated to microseismic monitoring, the receivers and acquisition systems that are currently available work under good conditions. It is possible to parameterize them so that they record only significant signals for characterization of the site, such signals being referred to as E type signals.

On the other hand, event identification is more difficult if the monitoring system is placed in a well under development because events induced by completion operations, referred to as C type events hereafter, are also recorded. These events are generated by injection stops and resumptions, opening or closure of one of the completion elements (valve, packer, etc.) that can be at any depth in the well or at the surface (on the wellhead) and even at the level of the surface installation (lines, various devices). Some of these actions, such as communicating the underground zone (reservoir) with the surface network can induce therein, as a result of pressure variations notably, E type events that are often deferred in time and that are desired to be recorded and interpreted. C type events, which can be in large numbers in a relatively short time interval (more than 3400 events within one week for example), harm real-time monitoring of the geomechanical phenomena induced through acquisition of E type events whose number, within the same period, is often relatively low (several ten events for example).

It is therefore very difficult to rapidly discriminate the data files (records of the signals received) corresponding to the E type microseismic events coming from the formations from those corresponding to C type events induced during completion. All (E and C type) events meet the criteria of the commonest digitizing algorithms: detection by exceeding an amplitude or energy threshold and/or detection by exceeding a threshold for a slope ratio representing the slope of the signal in a short time interval divided by the slope of the signal in a longer time interval (triggering on a transient event and not on a signal drift), etc. In order to differentiate between E and C type events, a more suitable algorithm is required, which takes into account the spectrum of the signal, the transit times associated with particular wave reflections during completion, amplitude variations between various wave types, all these operations being much more difficult to control in real time.

SUMMARY OF THE INVENTION

The method according to the invention simplifies problems of discrimination and identification of seismic or microseismic events relative to the development of an underground zone.

The method comprises installation, in one or more wells, of elastic wave receivers and of at least one reference pickup with direct acoustic coupling with elements of the technical zone development equipment for detection of the elastic waves directly connected with the development, acquisition of the signals coming from the various receivers and from the (or each) reference pickup in response to the waves received, and comparative analysis of the signals coming from these receivers and from each reference pickup in order to classify the records into different families according to whether the events in the underground zone are independent of the events detected by each reference pickup or depend thereon directly or indirectly.

The method preferably comprises creating up a catalogue of type events having a causal link with development operations in the underground zone, by correlation between the records of the signals received respectively by the receivers and by the (or each) reference pickup, thus allowing identification of the nature of the seismic or microseismic events.

The method can also comprise a combination of the records of the signals coming from the receivers and from the (or each) reference pickup, allowing identification of recorded events.

The receivers can be, for example, permanent receivers permanently installed in at least one well behind a casing pipe or in the annulus between a casing pipe and a production string so as to leave it clear in any case for development of the underground zone.

According to an embodiment, at least one reference pickup is used, which can be acoustically coupled with a production string of said zone, or with both this string and the formations surrounding the well.

The method can be applied to both passive seismic operations and to active seismic prospecting operations with use of a source of elastic waves and recording of the signals coming from the formation in response to the excitation of the formations by triggering the sonde.

The system according to the invention comprises elastic wave receivers, at least one reference pickup with direct acoustic coupling with elements of the technical zone development equipment for detection of the elastic waves directly connected with the development, acquisition and recording devices for the signals coming from the various receivers and from each reference pickup in response to the waves received, a transmission device and an acquisition and processing unit comprising programmed computer for performing a comparative analysis of the signals coming from the receivers and from each reference pickup, and for classifying the records into different families according to whether the events in the underground zone are independent of the events detected by each reference pickup or depend thereon directly or indirectly.

The method according to the invention has many advantages. First a considerable saving of time, early classification of the events allowing immediate or nearly immediate analysis of the E type events. Location of seismic or microseismic events being thus made more reliable, the site monitoring quality and production follow-up results are improved and, in some underground storage applications, contribution to a better environmental protection and to a higher degree of safety is provided.

BRIEF DESCRIPTION OF THE DRAWINGS

Other features and advantages of the method and of the device according to the invention will be clear from reading the description hereafter of embodiments given by way of non limitative examples, with reference to the accompanying drawings wherein.

DETAILED DESCRIPTION OF THE INVENTION

Figure 1:
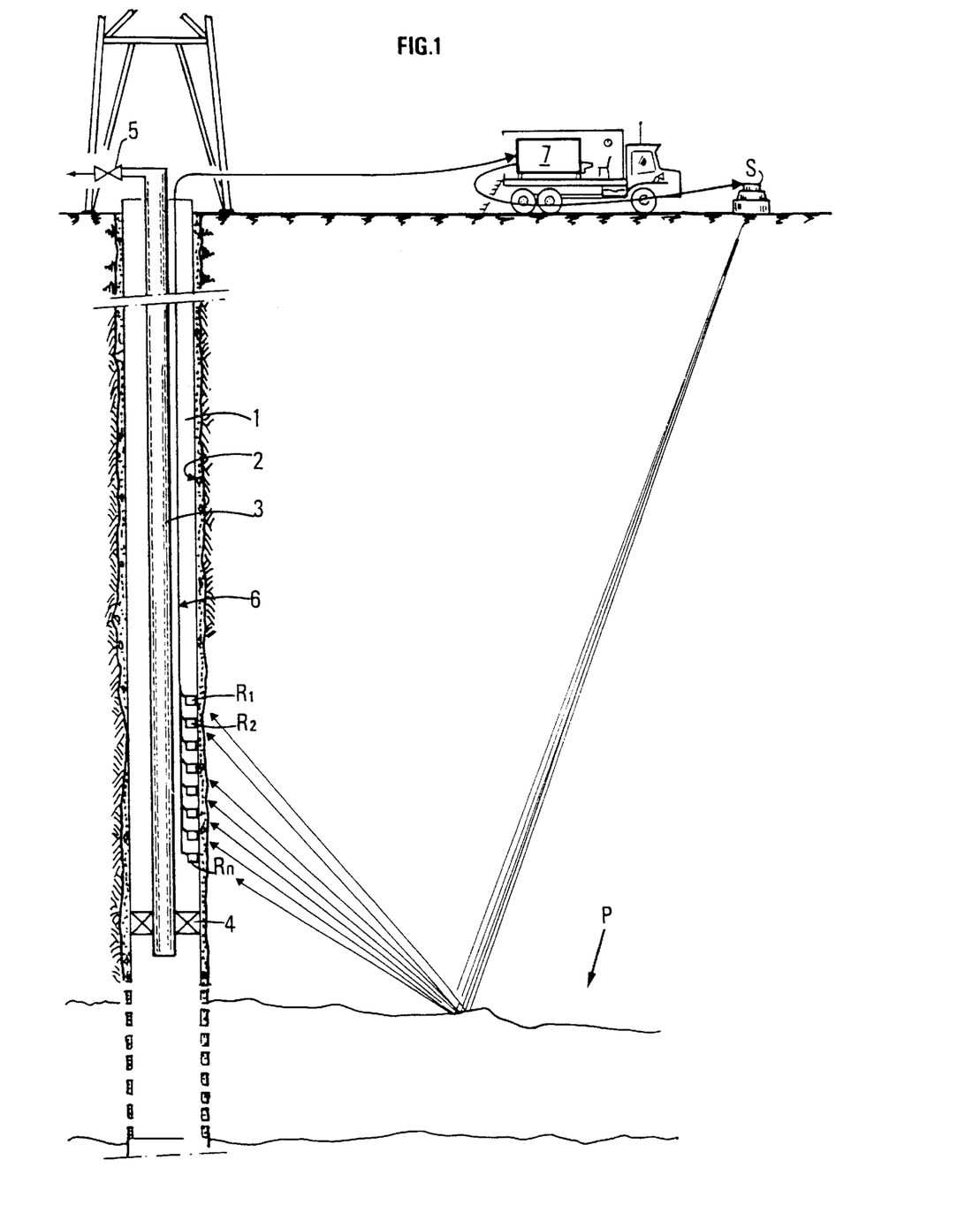
FIG. 1 diagrammatically shows elastic wave receivers R associated with well completion equipment.

The seismic or microseismic monitoring system schematized in FIG. 1 is installed in a well 1 provided with a casing pipe 2 which, once in place, is coupled with the surrounding formations by injecting cement between the pipe and the well. A production string 3, consisting of interconnected tubular sections, is lowered into the cased well. This string 3 can be provided, at the base thereof, with an expansible sealing device 4 such as a packer or any other device commonly used in production wells. By closing this expansible device, the annular space between the string and the casing pipe is insulated. Operations are performed in an underground zone P by means of this string (in order to extract or to inject fluids therein). A pump (not shown) and valves 5 allow controlled activation of the zone considered.

The method according to the invention comprises installation, in one or more wells, of a reception device comprising in combination:

an elastic wave reception set (FIG. 1) having of a plurality of elastic wave reception units R1, R2, . . . , Rn of any well-known type, that can be coupled in operation with the inner wall of casing pipe 2 but acoustically decoupled from production string 3, and one or more reference pickups T (FIG. 5) sensitive to displacements, velocities or accelerations. They are installed so as to be acoustically coupled with the completion (development) equipment and thus to collect all the signals connected with the various actions performed during the development of each well.

Reception units R1–Rn are positioned at determined intervals in relation to one another along the tubular string. A multi-conductor cable 6 allows connection of reception units R1–Rn to a surface central control and recording station 7.

Connection of reception units R1–Rn to central station 7 can be achieved directly by transmission lines in cable 6 or better still by means of one or more local electronic units allowing multiplexing of the signals picked up by the various reception units and their coded transmission, such as those described in the assignee's French patents 2,613,496 and 2,616,230.

Within the scope of operations of monitoring of reservoir P, a seismic source S placed either at the surface (as shown) or in a well, or embedded as described in patent French Patent 2,728,973, can be used.

Figure 2:
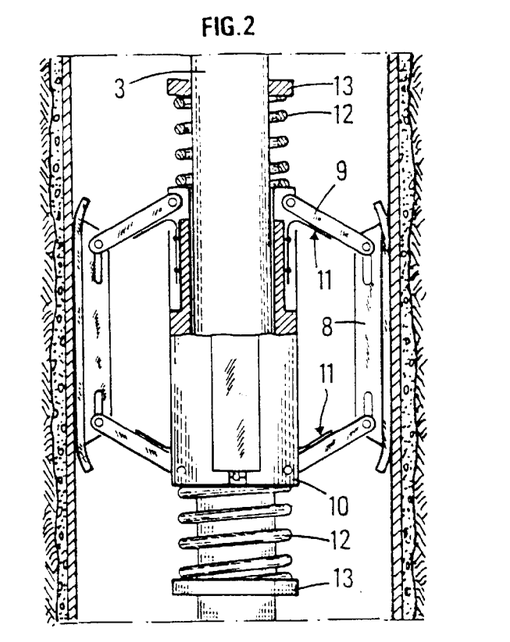
FIG. 2 shows a first example of device for decoupling the receivers from the production string.

As already described in the aforementioned patent French Patent 2,674,029, reception units R1–Rn (illustrated in detail in FIG. 2) can be included in pads 8 pressed against the inner wall of the casing pipe. These pads are for example connected to arms 9 that can pivot with respect to a sleeve 10 centered on the string and held in a spaced position by plate springs 11. Springs 12 hold sleeve 10 up between two stationary stops 13.

Figure 3:
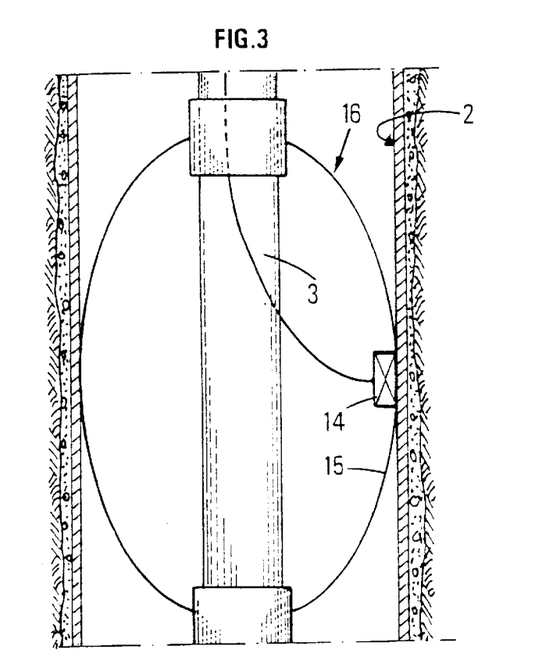
FIG. 3 shows a second example of a flexible device for decoupling the receivers from the production string.

According to the coupling mode of FIG. 3, each reception unit R can be included for example in a housing 14 connected to flexible blades 15 of an off-centering device 16 fastened around a section of string 3.

Figure 4:
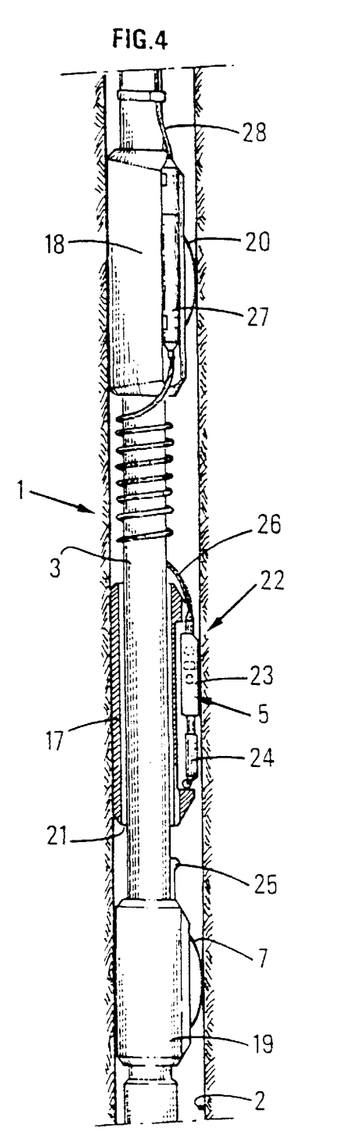
FIG. 4 shows a third example of means for decoupling the receivers from the production string, FIG. 5 diagrammatically shows two reference pickups, one, T1, acoustically coupled with the production string, the other, T2, coupled with both the string and the casing pipe.

Receivers R1–Rn can also be coupled with the formations surrounding the well by a support such as that described in the aforementioned patent French Patent 2,656,034. Each support comprises an intermediate shoe 17 between two off-centring shoes 18, 19 fastened around string 3 at a certain distance from one another. The off-centring shoes are provided each with spring plates 20 identically positioned so as to press them against the casing wall 2 according to the same radial plane. Intermediate shoe 17 similarly surrounds string 3. It is provided with a central passageway 21 whose section is larger than the section of string 3. Intermediate shoe 17 comprises a mobile element 22 provided with housings for a detector 23 such as triaxial geophones for example. Springs (not shown) are positioned so as to drive the mobile element into its position of coupling with the wall of the casing pipe. A hydraulic device including a jack 24 allow control of the displacement thereof into its position of extension. A linking element 25 is used during the descent of the string for connecting the intermediate shoe to the two others. The assembly is so arranged that, in the position of operation, the mobile element is in contact with casing pipe 2, and intermediate shoe 17 is mechanically decoupled from string 3. Receivers R1 to Rn are connected by conductors 26 to an electronic digitized acquisition and transmission box 27 which is connected to a multi-conductor cable 28 providing connection with surface central station 7 (FIG. 1).

Reference pickups (FIG. 5) are directly coupled with the production string for example (like pickup 28) or possibly acoustically coupled with both the string and the walls surrounding the well (like pickup 29).

Figure 5:
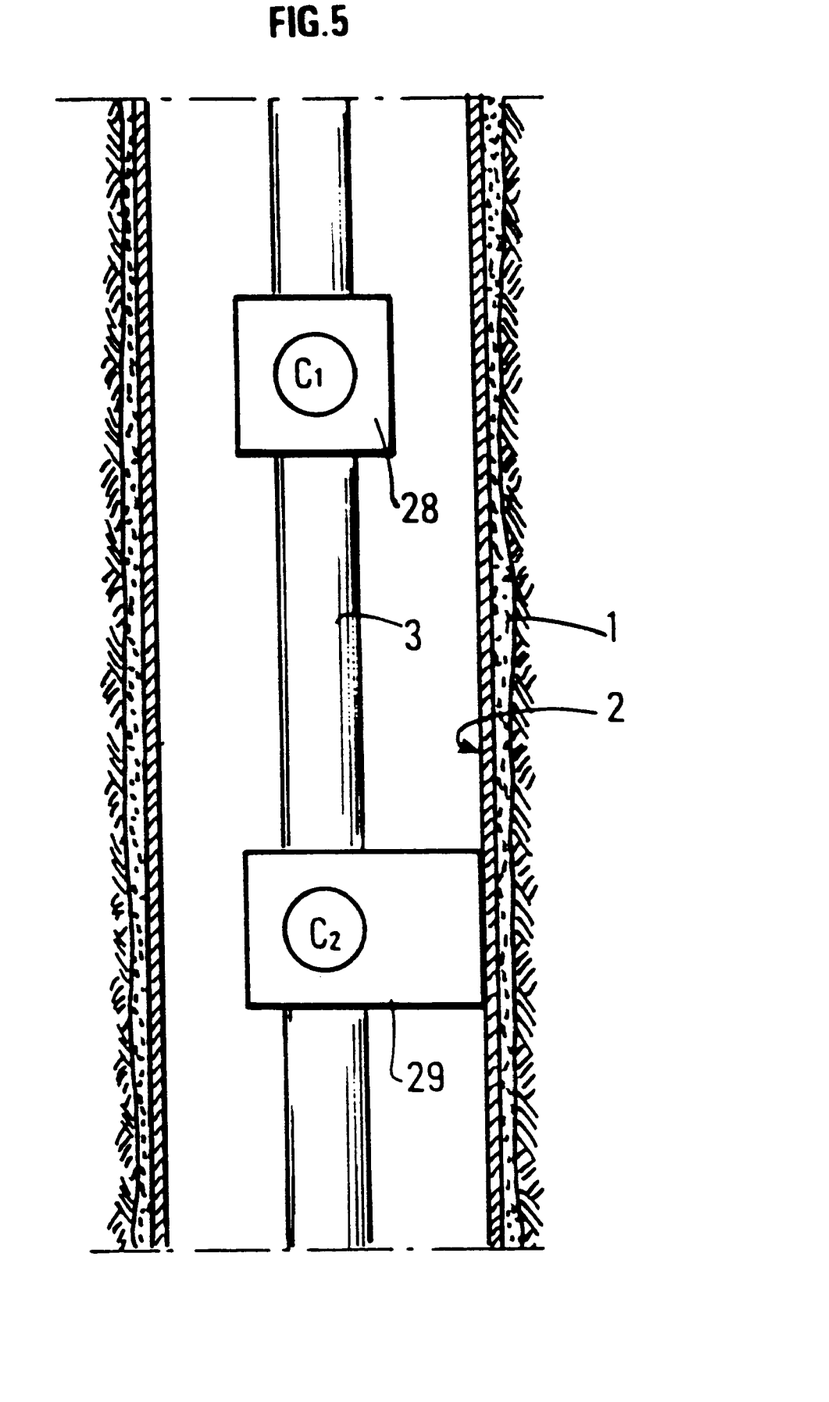
Figure 6:
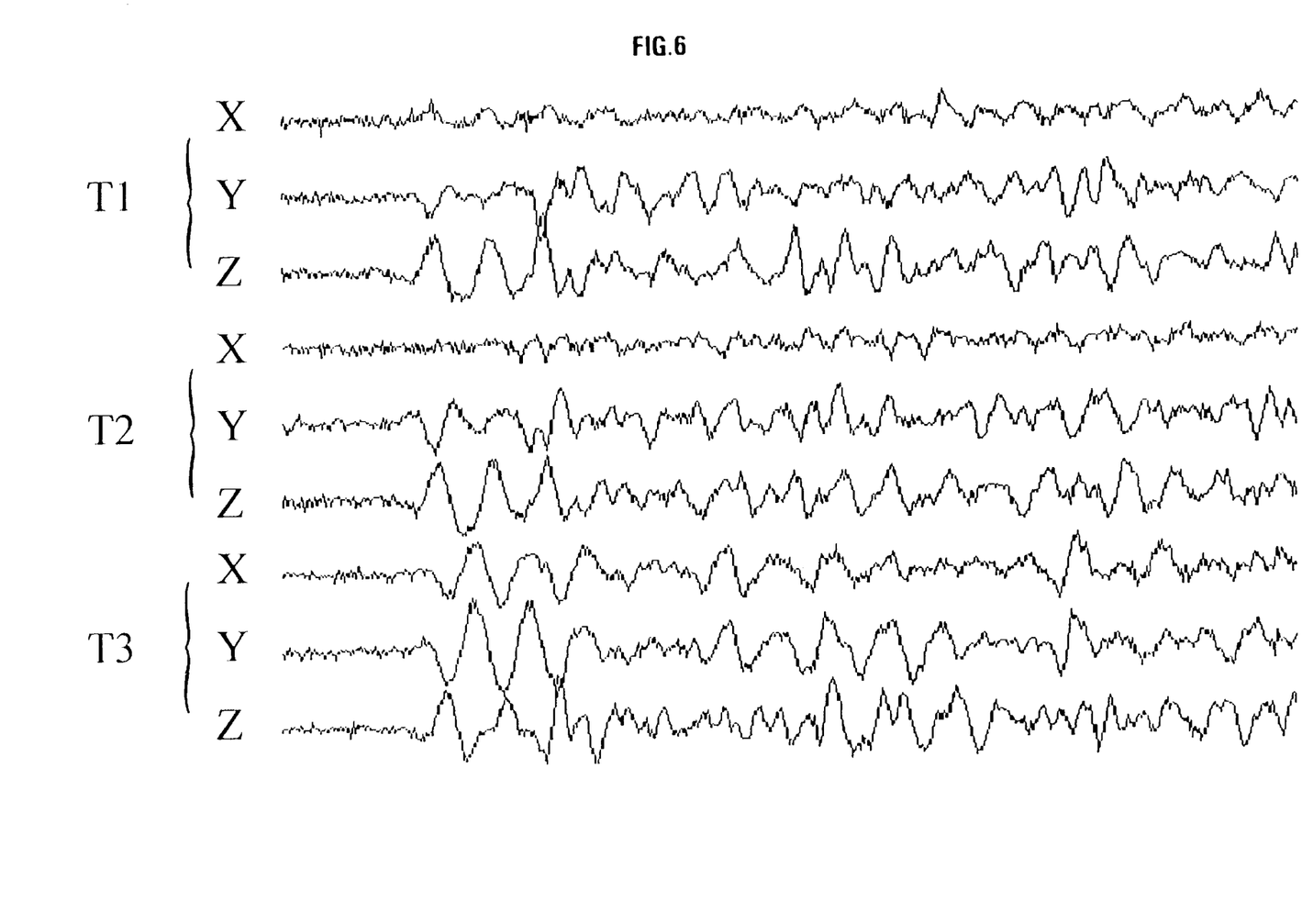
FIG. 6 shows the example of an E type event recorded on three three-component pickups, which is the consequence, but only in an indirect way, of actions on the technical site development equipment (bringing in, depletion, injection etc.)
Figure 7:
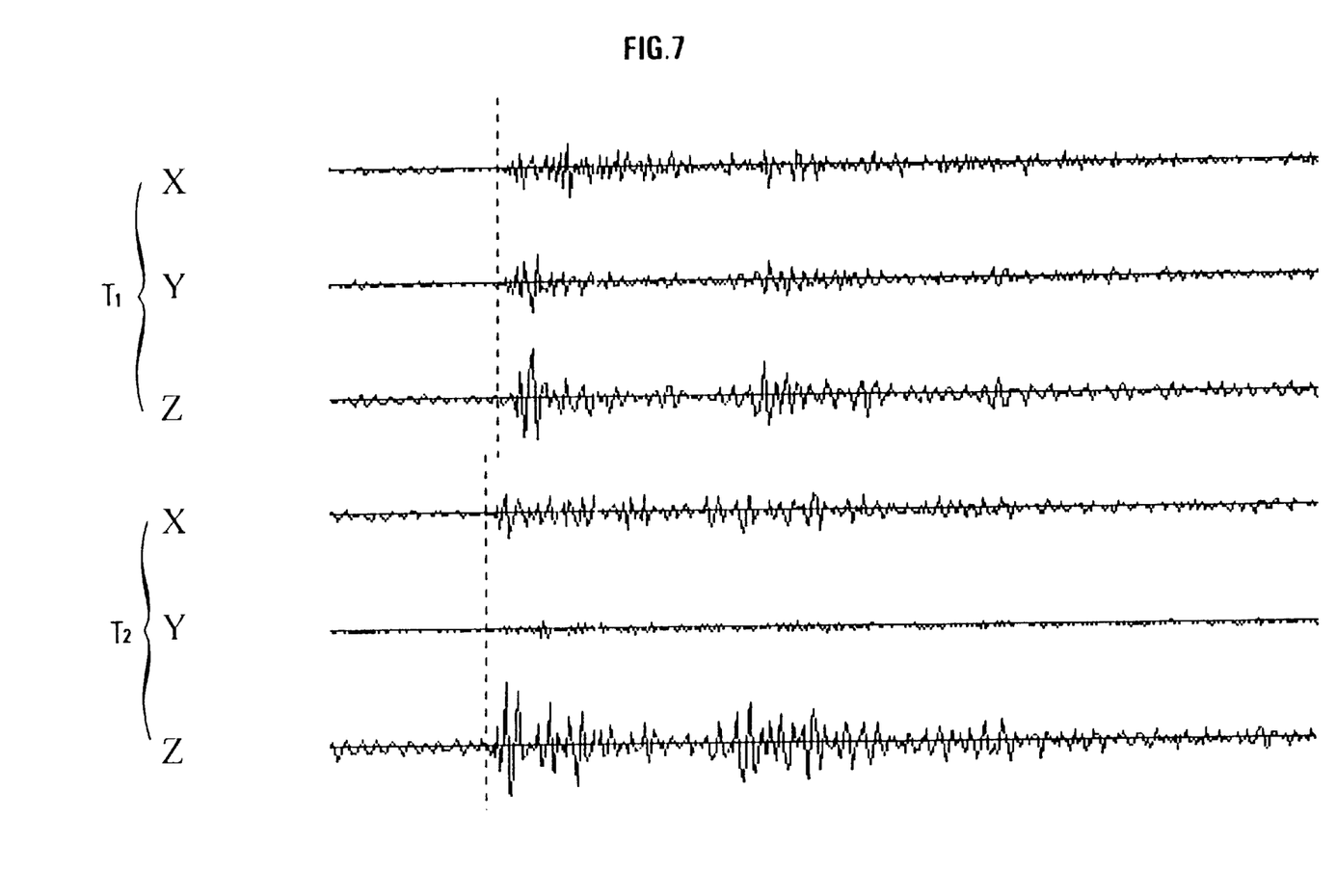
FIG. 7 shows the example of seismic signals picked up on two three-component pickups and representative of a C type event, directly revealing actions on the technical site development equipment (valve opening or closure for example).

At least two reference pickups in contact with the string can for example be used, one positioned at a depth of some meters for example, the other at a greater depth. These reference pickups are connected to the surface recording equipment like receivers R (directly or by means of local electronic modules (not shown)). Several reference type pickups allow determination of the direction of propagation of C type events.

In order to help interpretation and processing of the seismic data, other types of pickups can be installed in the wells, such as hydrophones or accelerometers.

The method according to the invention first allows, by means of a comparative analysis of records of the signals coming from permanent pickups R1–Rn and from reference pickup(s) in contact with the string, to isolate the E type events (coming from the monitored zone) from all the records obtained, those which are the direct consequence, very closely in time, with actions of the technical zone development equipment. These are notably fluid injection or production stops and resumptions through production string 3, which may for example have the effect of creating, in a zone close to the periphery of the wells, sudden pressure variations in the environment, thus inducing mechanical readjustments, or even mechanical damage of the formation, at the origin of seismic emissions, and those which are only indirectly and more or less delayed in time with actions of the technical zone development equipment result of the reservoir depletion and/or of a massive injection. This is the case for an environment compaction phenomenon that can be observed in the chalky reservoirs of the North Sea. It is also the case when a large-scale readjustment of the mechanical stresses occurs, at the level of the structure or even in a whole region (several ten km).

It also allows better identification of the influence of the production protocol applied to the site or the region of the site on the geomechanical behavior of the site, which can also be compared with the productivity evolution.

According to their location, reference pickups T thus preferably receive the signals emitted at the level of completion operations and allow real-time identification of C type events on the basis of simple criteria (amplitude of the signals on a certain number of channels for example, overstepping of a threshold value, a particular arrival time, a frequency, etc.). In the absence of signals characteristic of C type events, those of E type can be interpreted as such.

Addition of these monitoring pickups T also allows finer interpretation of E type events. In fact, by installing a sufficient number of such pickups T and/or by studying their response to specific actions at the completion level, some E type events can be connected with the bringing in of some well or other. An E type event located in a given region of the reservoir is emitted for example only when a certain well is in communication with the reservoir or when a certain combination of wells is in service. A catalogue of the C type events relative to each well is first drawn up, each one of them being readily identifiable and corresponding to a precise action or combination of actions in the well or the production line.

In case of gas storage in an underground aquifer, such information can significantly help towards understanding of the fluid flows and can therefore be used for optimizing the positioning of new wells. Intelligent exploitation of C type events in an entire site therefore constitutes a fast and reliable way to characterize the origin of E type events better.

Comparative analysis of C and E type signals allows assessment of the response times of certain geomechanical phenomena by knowing the time between the bringing in of a well and the occurrence of certain E type events.

This process allows identification and classification of the events in connection with some action or other by the site operator in order to optimize real-time processing of E type events (generated in the environment in reaction to technical operations).

Processing of these E type events comprises first sorting the data files (signal records) into various distinct classes according to the C and/or E events corresponding thereto and applying suitable processing to the files of each class. Particular attention must be given to events that may herald an exploitation risk: damage to the diggings (well, cavity, etc.) or to the environment; sand encroachment risks for example, which are dealt with as a priority.

Known processing operations can also be applied to E and C type events recognized as concomitant so as to make E type events more understandable.

Within the scope of conventional seismic acquisitions, the pickups coupled with production string 3 can be used for identifying possible tube waves or guided waves, thus contributing to improving the processing of seismic data.

Analysis of the signals can be achieved directly by the interpreter or assigned to a computer (not shown) placed for example in central station 7 and programmed to identify the nature of the events in connection with a pre-established catalogue.

A simplified (and non limitative) example of possible classification into different families is illustrated by the table hereunder:

| Type of event | Reception by pickups T | Reception by pickups R1-Rn | F1 family | F2 family | F3 family | F4 family | Action |
|---|---|---|---|---|---|---|---|
| C1 | YES | YES | – | | | | Action 1 |
| C2 | YES | YES | | + | | | Action 2 |
| E | NO | YES | | | | + | Action 3 |
| E + C2 | YES | YES | | | + | | Action 4 |

In this table:

C1 refers to the signals picked up in response to an action on the technical development equipment, the well being closed in relation to the reservoir;

C2 refers to the signals picked up in response to an action on the technical development equipment, the well being open onto the reservoir;

E refers to the signals picked up in response to events characteristic of a geomechanical phenomenon in the zone studied;

F1 to F4 refer to file families;

+, to files to be analyzed or processed for monitoring of the zone,

–, to files devoid of any practical interest for the monitoring of this zone;

action 1, to a simple counting of events and preferably deletion of the files devoid of practical interest;

action 2–4, to the establishment of a selective causal connection between an E type event and a phenomenon resulting from the development of the zone, either by direct analysis by the interpreter, or automatically by a computer programmed to analyze and to sort the events from a pre-established catalogue.

An embodiment where the receivers are born by the production string 3 has been described. It would also be possible, without departing from the scope of the invention, to use a set of receivers (R1–Rn) included in one or more sondes of a well-known type lowered into one or more wells at the end of a electrical cable, in combination with one or more reference pickups coupled with casing pipe 2 but sufficiently far away from receivers R1–Rn, in the neighborhood of the wellhead for example. Coupling of such a pickup with the casing pipe can be done by embedding it in sealing cement behind the casing pipe, as described in the aforementioned U.S. Pat. No. 2,593,292.

What is claimed is:

1. A method for facilitating identification of seismic or microseismic events relative to the development of an underground zone, comprising coupling permanent receivers with a wall of at least one well for sensing first elastic waves coming from the underground zone in response to the seismic or microseismic events, positioning at least one reference pickup with a direct acoustic coupling with elements of equipment used for the technical development of the zone for sensing parasitic elastic waves directly generated by the technical development, acquiring and recording first signals sensed by the permanent receivers and second signals sensed by each reference pickup and comparatively analyzing the first signals sensed by the permanent receivers and signals sensed by each reference pickup, sorting the recorded signals into different families according to whether the first signals only depend on seismic or microseismic events in the underground zone or directly or indirectly depend on parasitic elastic waves directly generated by the technical development.

2. A method as claimed in claim 1, comprising correlating the first signals and the second signals for creating a catalogue of type events having a causal connection with development operations in the underground zone.

3. A method as claimed in claim 1, further comprising combining the first signals and the second signals for classifying the recorded signals into different families.

4. A method as claimed in claim 1, comprising coupling at least two multi-component permanent receivers with the wall of at least one well and comparatively analyzing components of the signals sensed by the receivers for detecting seismic or microseismic events in relation with hydraulic fractures and determining location thereof.

5. A method as claimed in claim 1, comprising coupling permanent receivers with the wall of at least one well by placing the receivers behind a casing pipe, which leaves the at least one well clear for development of the underground zone.

6. A method as claimed in claim 1, comprising coupling permanent receivers with the wall of at least one well by placing the receivers in an annulus between a casing pipe and a production string, which leaves the well clear for development of the underground zone.

7. A method as claimed in claim 5, wherein the permanent receivers are installed in one well.

8. A method as claimed in claim 6, wherein the permanent receivers are installed in one well.

9. A method as claimed in claim 5, wherein the permanent receivers are installed in different wells.

10. A method as claimed in claim 6, wherein the permanent receivers are installed in different wells.

11. A method as claimed in claim 1, comprising acoustically coupling at least one reference pickup with a production string used for the technical development.

12. A method as claimed in claim 5, comprising acoustically coupling at least one reference pickup with a production string used for the technical development.

13. A method as claimed in claim 6, comprising acoustically coupling at least one reference pickup with a production string used for the technical development.

14. A method as claimed in claim 1, comprising using at least one reference pickup acoustically coupled with both a production string used for the technical development and with the walls of at least one well.

15. A method as claimed in claim 1, comprising using reference pickups placed at different depths in at least one well, for determining a direction of propagation of the waves sensed by the reference pickups.

16. A system for facilitating identification of seismic or microseismic events in an underground zone under development, comprising permanent receivers for sensing elastic waves coupled with the walls of at least one well, at least one reference pickup with a direct acoustic coupling with elements of an equipment used for the technical development of the underground zone for sensing parasitic elastic waves directly generated by the technical development, a device for acquiring and recording first signals sensed by the permanent receivers and second signals sensed by each reference pickup, a transmission device for transmitting the first and second signals to ground and an acquisition and processing unit comprising a computation device programmed for comparatively analyzing the first signals sensed by the receivers and signals sensed by each reference pickup, which sorts the recorded signals into different families according to whether the first signals only depend on seismic or microseismic events in the underground zone or directly or indirectly depend on parasitic elastic waves directly generated by the technical development.

17. A system as claimed in claim 16, comprising at least one reference pickup mechanically coupled with a well production string.

18. A system as claimed in claim 16, comprising at least one reference pickup mechanically coupled with a casing pipe separated from the elastic wave receivers.

19. A system as claimed in claim 17, comprising at least one reference pickup mechanically coupled with a casing pipe separated from the elastic wave receivers.

20. A system as claimed in claim 16, comprising a plurality of elastic wave receivers permanently installed in at least one well.

21. A system as claimed in claim 17, comprising a plurality of elastic wave receivers permanently installed in at least one well.

* * * * *